Dec. 24, 1968    A. H. HOORMANN    3,417,948
PARACHUTE STOWAGE TOOL
Filed March 30, 1967    2 Sheets-Sheet 1

INVENTOR
ALOYSIUS H. HOORMANN
BY Cohn and Powell
ATTORNEYS 3,417,948
PARACHUTE STOWAGE TOOL
Aloysius H. Hoormann, 11911 Natural Bridge Ave.,
Bridgeton, Mo. 63042
Filed Mar. 30, 1967, Ser. No. 627,042
18 Claims. (Cl. 244—148)

ABSTRACT OF THE DISCLOSURE

A tool to facilitate the stowing of parachute suspension lines, the tool including a pair of oppositely facing frames each having a row of hooks along its length adapted to be placed over the parachute pack. The hooks on each row are spaced apart at equal intervals, and each row is spaced apart from its associated row to provide an apparatus for gauging and tensioning the length and spacing of the loops of the suspension lines in preparation for stowage.

Also disclosed is a method of preparing the lines for stowage utilizing oppositely facing rows of hooks.

Background of the invention

This invention relates generally to a parachute stowage tool, and more particularly to a portable tool which is used to prepare the suspension lines of a parachute for stowage.

The failure of a parachute to open will result, almost certainly, in a fatality. It is, therefore, of the utmost importance that the parachute canopy and the parachute lines be packed carefully and efficiently into their containers. It is not surprising that stringent safeguards attend the packing of parachutes, whether such packing be done in the shop or in the field. In spite of these precautions, and because up until now no suitable tools have been designed to aid in the packing of parachutes, much of the packing or stowing operation is done by hand. One of the crucial phases of parachute folding, that of folding the suspension lines in preparation for stowage, is thus subject to human error without the assistance of any tool or device. The human eye must measure the length of the loops as made. The slight tension, which is applied as the loops are folded to avoid hidden entanglement or slackness in individual lines, is left to the rather unreliable instinct of the folding operator.

It is believed that the present tool provides an innovation in preparing the parachute lines for stowage by providing a means of gauging the length of each loop, gauging the proximity of each loop relative to its associated loops, and maintaining the requisite tension in the folded suspension lines to provide maximum efficiency, and more importantly, maximum safety in this phase of the packing of a parachute.

Summary of the invention

The stowage tool provides an arrangement of hooks enabling the folded lengths of the lines to be gauged, and the tool also gauges the proximity of the folds in relation to each other.

The tool provides a means of insuring that, as the lines are wound back and forth between rows from hook to hook, the requisite tension is maintained on the line, thereby obviating the possibility of internal entanglement and uneven tensioning in the lines throughout their length.

The hooks are attached at spaced intervals along the length of oppositely facing elongate elements, the hooks along one element constituting a row. The rows of hooks are disposed in spaced side-by-side relation.

The elongate element supporting each row of hooks constitutes a sleeve coaxial with the upper member of a frame, the frame providing a means of elevating the hooks over the pack. The first hook on each row is mounted inwardly of all other hooks in the same row, and each first hook is adjustable transversely to the length of a row. Each frame is supported on a base, and a cam means is provided pivotally mounted on the frame to release the frame from the base. The cam means includes a handle rotating the cam.

Each row of hooks is provided with an associated row of auxiliary hooks mounted on the elongate sleeve, each auxiliary hook being outwardly spaced from its associated primary hook. The auxiliary hooks provide means holding the bands in a primed position for subsequent attachment to the bights of the lines folded on the hooks.

Also disclosed is a method for stowing parachute lines which, in summary, includes the disposition of hooks in a fixed arrangement and winding the lines back and forth between elongate rows of hooks to enfold the parachute suspension lines correctly prior to final stowage of the lines.

The features referred to in this summary, together with numerous other advantages of the invention, will more clearly appear from the following detailed description of a preferred embodiment, particularly when considered in connection with the accompanying drawings.

Brief description of the preferred embodiment

Figure 1:
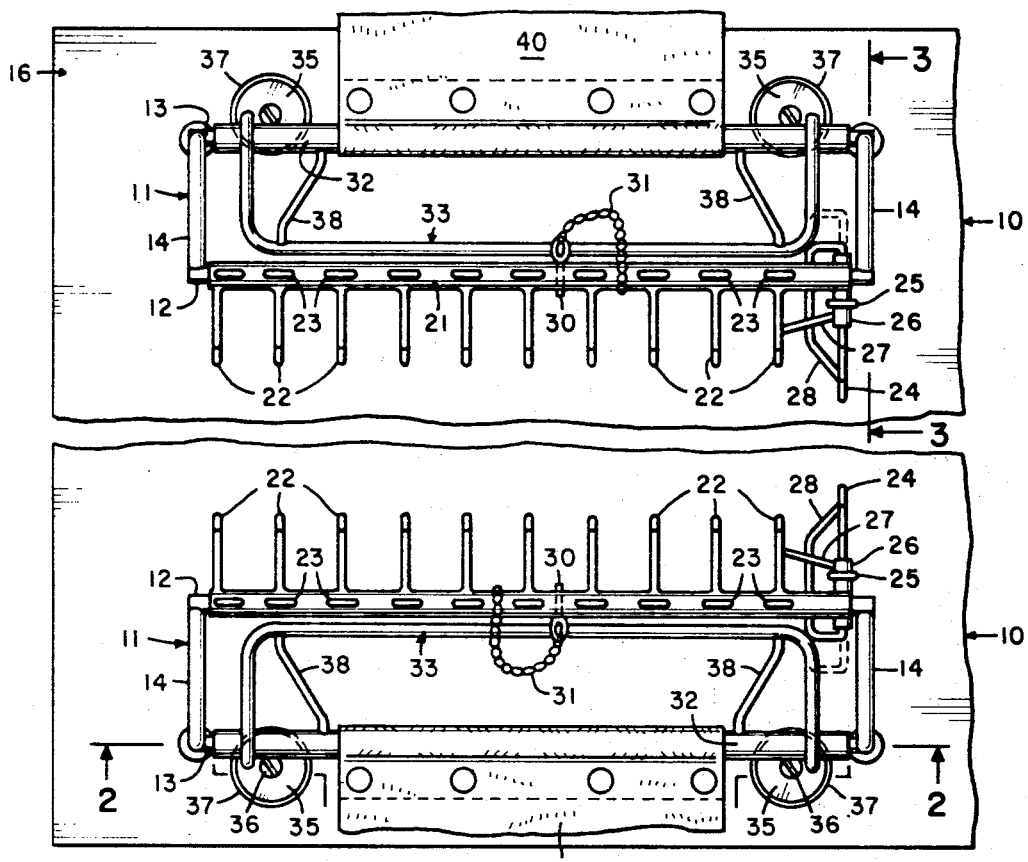
FIG. 1 is a fragmentary plan view of the oppositely arranged rows of hooks mounted on the frames.

Referring now by characters of reference to the drawings, and first to FIG. 1, it will be understood that the invention includes a pair of assemblies 10 which are mirror images of each other and, therefore, the description pertaining to one will be understood to pertain also to the other. Each assembly 10 includes an inclined, rectangular frame 11. The frame 11 has an upper member 12 and a lower member 13 spaced apart by side members 14 attached to each end of the upper and lower members 12 and 13 as by welding. The side members 14 are inclined for the greater part of their length, but are provided at their lower ends with projecting, vertical portions forming spigot-like legs 15.

A base or surface 16 which, in the present embodiment is constructed of plywood, is fitted with socket inserts 17. The socket inserts 17 are spaced apart to receive the spigot-like legs 15 of the frame 11. A washer 20, upwardly spaced from the end of each leg 15, cooperates with the upper margin of the socket insert 17 to form a stop means limiting the insertion of the leg 15 within the socket insert 17.

Figure 2:
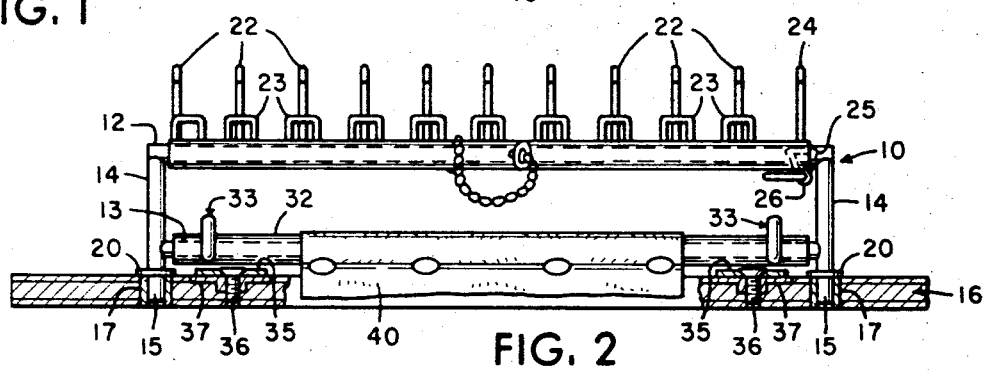
FIG. 2 is a sectional elevation on lines 2—2 of FIG. 1, illustrating one row of primary and auxiliary hooks mounted in an elevated position.
Figure 3:
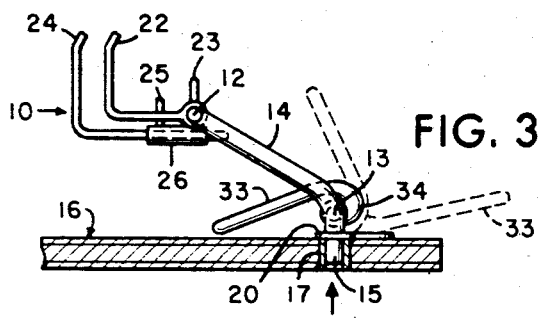
FIG. 3 is an end view of one half of the tool, showing the release handle in various positions.

The upper member 12 of the rectangular frame 11 is fitted with a coaxial sleeve 21. A plurality of L-shaped primary hooks 22, and U-shaped auxiliary hooks 23 project transversely from the coaxial sleeve 21. The primary hooks 22 and the auxiliary hooks 23 are attached to the sleeve 21 as by welding. At one end of the sleeve 21, a special primary hook 24 and an associated and auxiliary hook 25 are provided. The end primary hook 24 is laterally adjustable by reason of being slidably received within a laterally underslung sleeve 26 attached, as by welding, to the underside of the coaxial sleeve 21. This arrangement is clearly shown in FIG. 3. It will be noted that the end auxiliary hook 25 associated with the end primary hook 24 is mounted on the upper face of the underslung sleeve 26 rather than on the coaxial sleeve 21, and is thereby placed inward of the row of auxiliary hooks 23 relative to the disposition of the tool as a whole. An outrigger bracing member 27 (FIGS. 1 and 2) connects the laterally underslung sleeve 26 to the adjacent primary hook 22, thereby providing support means for the underslung sleeve 26. The looped configuration 28 of the end primary hook 24 provides limiting means for the movement of the end hook 24 within the underslung sleeve 26.

A key 30, attached by a chain 31 to the coaxial sleeve 21, interfits aligned holes (not shown) in the coaxial sleeve 21 and the upper member 12 of the rectangular frame 11 to fix the coaxial sleeve 21 in position relative to the upper member 12. This arrangement serves to provide the primary and auxiliary hooks 22 and 23 with a vertical alignment in an elevated position over the pack while the tool is in use. Removal of the key 30, of course, renders the tool collapsible for storage purposes of the tool.

The lower member 13 of the rectangular frame 11 is provided with a coaxial sleeve 32 pivotally mounted on the lower member 13. An U-shaped handle 33 is attached at its ends to the coaxial sleeve 32, as by welding and, as can be seen from FIG. 3, rotation of the handle 33 causes rotation of the sleeve 32. The attachment of the U-shaped handle 33 to the sleeve 32 is off-set from the sleeve 32 and, as will be clear from FIG. 3, the attached portions 34 of the U-shaped handle 33 have a spiral configuration constituting a cam. Each cam portion 34 cooperates with a rotatable surface, provided by a disc 35, such that rotation of the handle 33 in a clockwise direction exerts an upward pull on the spigot-like legs 15 of the rectangular frame 11, resulting in the withdrawal of the legs 15 from the socket inserts 17. This feature facilitates the release of the frame 11 from the base 16. In the present embodiment the rotatable surface is provided by disc 35 rotating about pin 36 against a bearing insert 37. It has been found that a roller, inset into the base and having an axis of rotation parallel with the axis of rotation of the coaxial sleeve 32, serves this purpose equally as well as a rotating disc 35 described above.

Warning indicators in the form of flaps 40, attached to the coaxial sleeve 32 of the frame 11, perform a safety function. It will be clear from FIG. 4 that if the side flap 41 of the pack is inadvertently folded into position before the tool has been removed, the indicator flap 40 will be visible. Although there is only one side flap 41 on each parachute, the indicator flap 40 is provided on each portion of the tool because the side on which the side flap 41 occurs may vary depending on the type of parachute.

Figure 4:
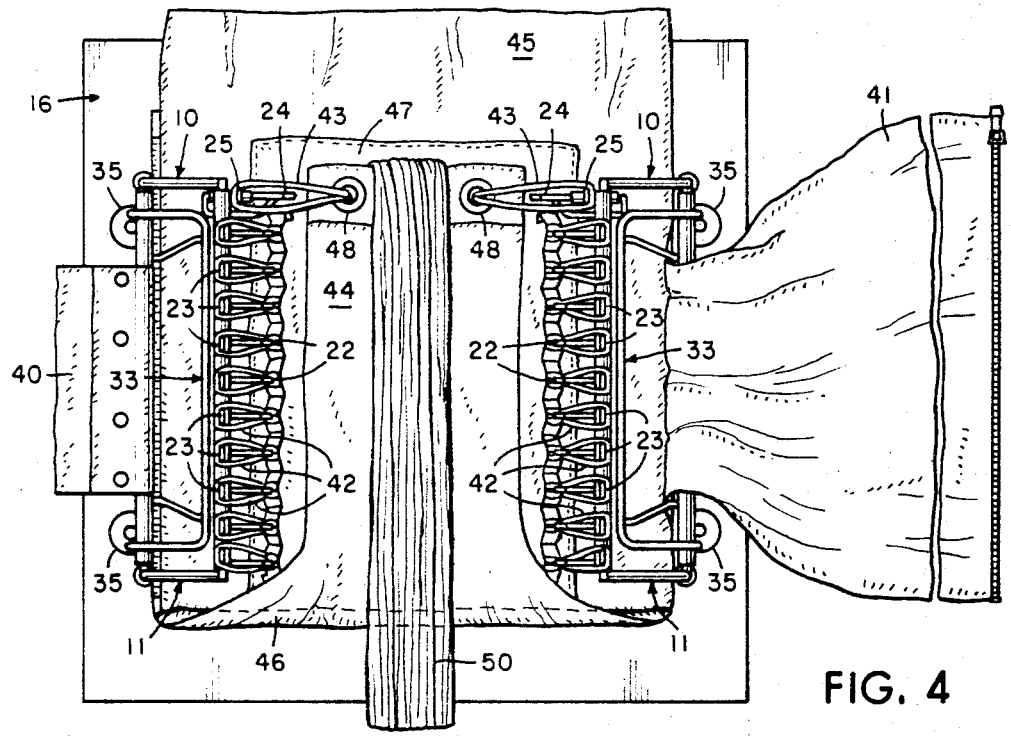
FIGS. 4 and 5 illustrate the disposition of the parachute suspension lines before and after folding respectively.

It will be importantly noted that the disposition of the primary hooks 22 and the associated auxiliary hooks 23, along the coaxial sleeve 21, match the location of the bight-retention bands 42 as is clearly indicated in FIG. 4. The special end primary hooks 24 and the end auxiliary hooks 25 are likewise disposed to correspond with the location of the bight-retention bands 43 located near to the end margin of the locking flap 44.

Figure 5:
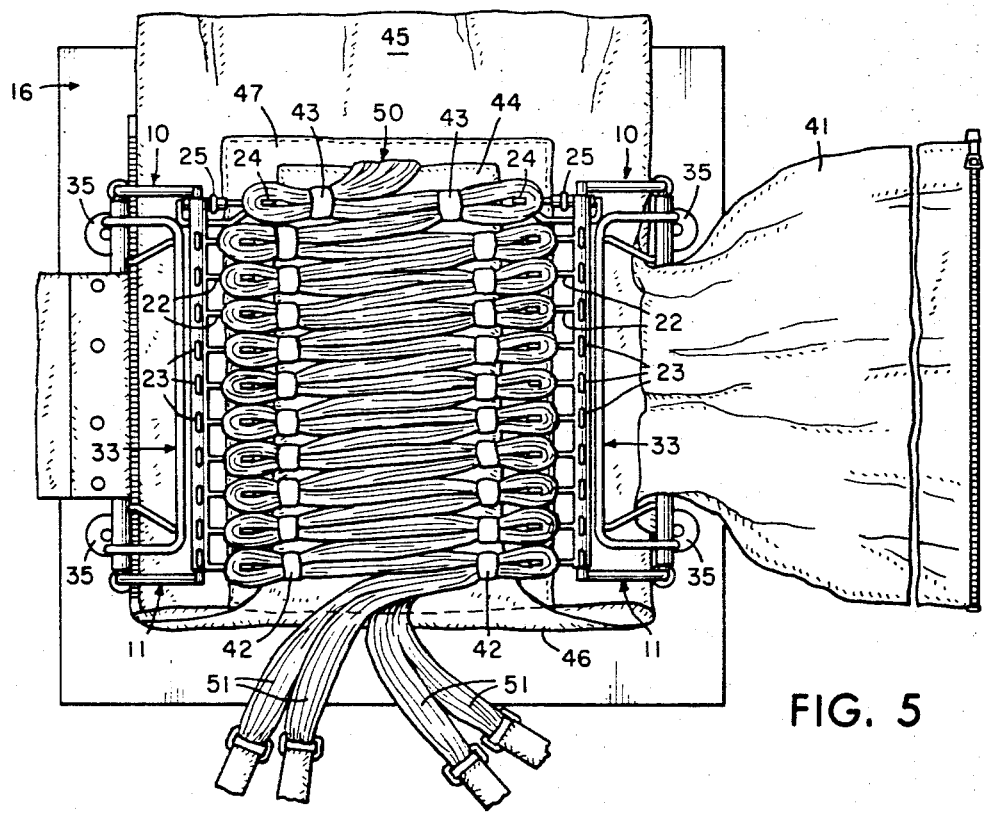

It is thought that the functional advantages of this parachute tool have become fully apparent from the foregoing description of parts, but for completeness of disclosure, the operational usage of the tool will be briefly described with particular reference to FIGS. 4 and 5.

FIG. 4 illustrates that the lower portion of the launching sleeve 45 which includes the parachute canopy (not shown) is laid out on the base 16. Each tool assembly 10 is plugged into position in the socket inserts 17, and each coaxial sleeve 21 is keyed in position so that the primary hooks 22 and associated auxiliary hooks 23 are elevated over the pack. The locking flap 44 has, at this stage, already been folded about the lower margin 46 of the launching sleeve 45, the special end primary hooks 24 having been retracted into the laterally underslung sleeves 26 in order to facilitate the accomplishment of this phase. It can be seen from FIG. 4 that the suspension lines 50 are in position and ready to be folded, an operation that was formerly undertaken entirely by hand.

The initial, special bight-retention bands 43 are pulled from their attachment point on the reinforcing patch 47 through eyelets 48. The special bands 43 are shown in FIG. 4 after having been drawn over the special, end auxiliary hooks 25 and are thereby in a primed position. Bands 42 are also indicated in a primed position over their respective auxiliary hooks 23. It will be noticed that the primary hooks 22 and the special end primary hook 24 are embraced by their respective bands 42 and 43.

The side flap 41 is passed through the open frame 11, constituting part of the right-hand assembly 10, and also through the U-shaped handle 33, prior to stretching bands 42 and 43 into a primed position.

Referring now to FIG. 5, the layout is essentially the same as shown in FIG. 4 with the exception that the suspension lines 50 are shown folded and in condition for stowage. It will be clear that the lines 50 comprise the four sets of riser lines 51.

FIG. 5 illustrates the completion of the folding of the lines 50, the lines having been wound first about and between the inwardly spaced special end primary hooks 24 and then wound back and forth between hooks 22 until all the required loops have been made.

Each of the bands 42 and 43, as shown in FIG. 5, has been removed from its primed position off each auxiliary hook 23 and 25 respectively, and slipped over the bights of the lines 50 folded on the associated primary hooks 22 and 24. Procedure manuals regarding the forming of the bights emphasize that they should be approximately one to one and a half inches in length, and that under or over this length could cause a line deployment malfunction. It will be clear that the present invention allows the bight-retention bands 42 and 43 to be paced with considerably accuracy and to be adjusted very easily.

Immediately after the stage of packing which has been reached as illustrated in FIG. 5, each tool assembly 10 is removed from the base 16 by rotating the U-shaped handle 33 outwardly, thereby bringing into play the cam portion 34 and the rotatable disc 35 to cause upward movement of the rectangular frame 11, and thereby facilitate removal of the legs 15 from the socket inserts 17. The tool assembly 10 at the right-hand side of FIG. 5 is easily disengaged from the side flap 41 by threading said flap 41 through the rectangular opening in the U-shaped handle 33.

When removal of the tool assemblies 10 has been accomplished, the side flap 41 may be operably folded and packing continued in the usual manner.

It is particularly pointed out that the tool lends itself to the stowage of suspension lines in the shop or in the field. It will be clear that the base 16 is not a mandatory requirement. Cross bars can be extended between and attached to opposite ends of the frames 11 of the pair of tool assemblies, which will then make a single unit.

I claim as my invention:
1. An assembly for preparing parachute suspension lines for storage in a parachute pack having bands for retaining folded suspension lines, comprising:
   (a) spaced rows of hook means mounted on a surface on which the suspension lines are folded, the hook means gauging the folding length of the lines, gauging the lateral proximity of the lines so folded, and tensioning the suspension lines, and
   (b) means for changing the position of a row of said hook means with respect to the surface to remove the hook means from the folded lines.
2. An assembly as defined in claim 1, in which:
   (c) the hook means includes a pair of oppositely disposed rows of hooks, the rows being disposed in spaced, side-by-side relation, and

(d) frame means elevate the hook means over the surface.

3. A tool for preparing parachute suspension lines for stowage in a parachute pack having bands for retaining folded suspension lines, comprising:
  (a) hook means on which the suspension lines are folded, the hook means gauging the folding length of the lines, gauging the lateral proximity of the lines so folded, and tensioning the suspension lines,
  (b) the hook means including a pair of oppositely disposed row of hooks, the rows being disposed in side-by-side relation,
  (c) base means for the tool,
  (d) frame means, mounted on the base means, elevating the hook means over the pack, and
  (e) cam means selectively releasing the frame means from the base means.

4. A tool as defined in claim 3, in which:
  (f) each row of hooks is pivotally mounted on the frame means for selectively disengaging the folded lines from the hooks.

5. An assembly for preparing parachute suspension lines for stowage in a parachute pack having bands for retaining folded suspension lines, comprising:
  (a) spaced rows of hook means mounted on a surface on which the suspension lines are folded, the hook means gauging the folding length of the lines, gauging the lateral proximity of the lines so folded, and tensioning the suspension lines, and
  (b) the hook means including opposing rows of primary hooks and opposing rows of auxiliary hooks behind the primary hooks, the auxiliary hooks holding the bands in a primed position for subsequent attachment to the bights of the lines folded on the primary hooks.

6. An assembly as defined in claim 1, in which:
  (c) the hook means includes a pair of oppositely disposed rows of hooks, the rows being disposed in spaced relation,
  (d) the hooks provide means holding the bands in a primed position for subsequent attachment to the bights of the lines folded on the hooks,
  (e) base means is provided for the tool, and
  (f) frame means, operably mounted on the base means, elevate the hooks over the pack.

7. A tool for preparing parachute suspension lines for stowage in a parachute pack having bands for retaining folded suspension lines, comprising:
  (a) hook means on which the suspension lines are folded, the hook means gauging the folding length of the lines, gauging the lateral proximity of the lines so folded, and tensioning the suspension lines,
  (b) the hook means including a pair of oppositely disposed rows of hooks, the rows being disposed in spaced relation,
  (c) the hooks providing means holding the bands in a primed position for subsequent attachment to the bights of the lines folded on the hooks,
  (d) base means for the tool,
  (e) frame means, operably mounted on the base means, elevating the hooks over the pack, and
  (f) cam means selectively releasing the frame means from the base means.

8. An assembly for preparing parachute suspension lines for stowage in a parachute pack having bands for retaining folded suspension lines, comprising:
  (a) spaced rows of hook means mounted on a surface on which the suspension lines are folded, the hook means gauging the folding length of the lines, gauging the lateral proximity of the lines so folded, and tensioning the suspension lines, and
  (b) the hook means including a pair of oppositely facing rows of primary hooks, the rows being disposed in spaced, side-by-side relation to each other,
  (c) the surface means including a base means,
  (d) frame means, operably mounted on the base means, supporting each row of hooks at a predetermined elevation over the surface, and
  (e) a row of auxiliary hooks outwardly spaced from each row of primary hooks to hold the bands in a primed position for subsequent attachment to the bights of the lines folded on the primary hooks.

9. A tool for preparing parachute suspension lines for stowage in a parachute pack having bands for retaining folded suspension lines, comprising:
  (a) hook means on which the suspension lines are folded, the hook means gauging the folding length of the lines, gauging the lateral proximity of the lines so folded, and tensioning the suspension lines,
  (b) the hook means including a pair of oppositely facing rows of primary hooks, the rows being disposed in spaced, side-by-side relation to each other,
  (c) base means for the tool,
  (d) frame means, operably mounted on the base means, supporting each row of hooks at a predetermined elevation over the pack,
  (e) a row of auxiliary hooks outwardly spaced from each row of primary hooks and adapted to hold the bands in a primed position for subsequent attachment to the bights of the lines folded on the primary hooks,
  (f) the base means including a rotating surface, and
  (g) cam means cooperating with the rotating surface to release the frame means selectively from the base means.

10. An assembly for preparing parachute suspension lines for stowage in a parachute pack having bands for retaining folded suspension lines, comprising:
  (a) spaced rows of hook means mounted on a surface on which the suspension lines are folded, the hook means gauging the folding length of the lines, gauging the lateral proximity of the lines so folded, and tensioning the suspension lines, and
  (b) the hook means including a pair of oppositely disposed rows of hooks, the rows being disposed in spaced, side-by-side relation,
  (c) one hook at one end of each row disposed inwardly of the other hooks in the same row to accommodate the initial bands that are spaced inwardly from the other bands, and
  (d) frame means elevating the hook means over the surface.

11. A tool for preparing parachute suspension lines for stowage in a parachute pack having bands for retaining folded suspension lines, comprising:
  (a) hook means on which the suspension lines are folded, the hook means gauging the folding length of the lines, gauging the lateral proximity of the lines so folded, and tensioning the suspension lines,
  (b) the hook means including a pair of support, elongate members disposed in side by side relation, each member having a row of inwardly disposed, transverse primary hooks,
  (c) one hook at one end of each support member being disposed inwardly of the other hooks in the same row,
  (d) a frame, including upper and lower elongate, horizontal members, elevating each row of hooks over the pack,
  (e) each support member being pivotally mounted on an elongate, horizontal frame member,
  (f) a base means, including socket means and rotating means, fixedly mounting each frame in the socket means,
  (g) cam means pivotally mounted on each lower elongate horizontal frame member cooperating with the rotating means to release the frame selectively from the socket means, the cam means including a handle rotating the cam means.

12. A tool as defined in claim 11, in which:

(h) a row of auxiliary hooks, mounted on the support members, is outwardly spaced from each row of primark hooks to hold the bands in a primed position for subsequent attachment to the bights of the lines folded on the primary hooks.

13. An assembly as defined in claim 1, in which:
(c) the hook means includes a row of hooks,
(d) frame means supports the hooks in an elevated position over the pack, and
(e) base means supports the frame.

14. A tool for preparing parachute suspension lines for stowage in a parachute pack having bands for retaining folded suspension lines, comprising:
(a) hook means on which the suspension lines are folded, the hook means gauging the folding length of the lines, gauging the lateral proximity of the lines so folded, and tensioning of the suspension lines,
(b) the hook means including a row of hooks,
(c) frame means supporting the hooks in an elevated position over the pack,
(d) base means supporting the frame, and
(e) cam means pivotally mounted on the frame means selectively releasing the frame means from the base means.

15. A tool as defined in claim 14, in which:
(f) the hook means includes an elongate sleeve transversely mounting the row of primary hooks,
(g) the frame means includes an elongate upper member pivotally mounting the elongate sleeve,
(h) means selectively secure the sleeve on the upper member with the hooks over the pack,
(i) the base means includes rotating means cooperating with the cam means to release the frame means,
(j) at least one primary hook is provided, inwardly adjustable of the other primary hooks relative to the suspension lines to accommodate an initial band that is spaced inwardly from the other bands.

16. A tool as defined in claim 15, in which:
(k) a row of auxiliary hooks is outwardly spaced, with respect to the folded lines, from the primary hooks to hold the bands in a primed position for subsequent attachment to the bights of the lines folded on the primary hooks.

17. A method for stowing folded suspension lines in pack having bands, including the steps of:
(a) disposing a pair of rows of hooks in side by side relation over the pack,
(b) winding the lines about a hook of one row to form a loop while maintaining a slight tension on the lines,
(c) then winding the lines about a hook in the other row to form a second loop, the slight tension being maintained,
(d) then returning to the first row and forming a loop on another hook of the first row and returning back and forth between the rows of hooks until all the required loops have been made,
(e) removing the looped lines from the hooks, and
(f) securing the bands in place on the bight of each loop.

18. A method for stowing parachute suspension lines as defined in claim 17, including the steps of:
(g) placing the bands over each associated hook prior to the winding operation,
(h) locating the bands in a primed position over the hooks, and
(i) slipping the bands off the hooks and attaching the bands to the bights of each loop before removing the looped lines from the hooks.

References Cited

UNITED STATES PATENTS 1,044,358  11/1912  Diamond _____ 269—246

MILTON BUCHLER, *Primary Examiner.*

RICHARD A. DORNON, *Assistant Examiner.*

U.S. Cl. X.R.

269—321